(12) United States Patent
Zeng et al.

(10) Patent No.: US 8,290,044 B2
(45) Date of Patent: Oct. 16, 2012

(54) INSTRUCTION FOR PRODUCING TWO INDEPENDENT SUMS OF ABSOLUTE DIFFERENCES

(75) Inventors: Mao Zeng, Austin, TX (US); Lucian Codrescu, Austin, TX (US)

(73) Assignee: QUALCOMM Incorporation, San Diego, CA (US)

( * ) Notice: Subject to any disclaimer, the term of this patent is extended or adjusted under 35 U.S.C. 154(b) by 1415 days.

(21) Appl. No.: 11/431,301

(22) Filed: May 10, 2006

(65) Prior Publication Data

US 2007/0263730 A1 Nov. 15, 2007

(51) Int. Cl.
*H04N 7/12* (2006.01)
(52) U.S. Cl. ......... 375/240.16; 375/240.12; 375/240.24; 375/240.01
(58) Field of Classification Search ............. 375/240.16, 375/240.12, 240.26
See application file for complete search history.

(56) References Cited

U.S. PATENT DOCUMENTS 7,555,513 B2 * 6/2009 Selvaggi et al. ............. 708/420
2003/0005267 A1 1/2003 Koba et al.

FOREIGN PATENT DOCUMENTS

| JP | 6225287 A | 8/1994 |
| JP | 2005070938 A | 3/2005 |
| JP | 2005072800 A | 3/2005 |

OTHER PUBLICATIONS

Intel: "IA-32 Intel Architecture Software Developers Manual vol. 2: Instruction Set Reference" Intel Software Developer's Manual, vol. 2, No. 245471-012, 2003.
International Preliminary Report on Patentability-PCT/US07/068389, The International Bureau of WIPO, Geneva Switzerland-Nov. 11, 2008.
International Search Report-PCT/US07/068389, International Search Authority-European Patent Office-Dec. 10, 2007.
Written Opinion-PCT/US07/068389, International Search Authority-European Patent Office-Dec. 10, 2007.

(Continued)

*Primary Examiner* — Sath V Perungavoor
*Assistant Examiner* — Geepy Pe
(74) *Attorney, Agent, or Firm* — Peter Michael Kamarchik; Nicholas J. Pauley; Jonathan T. Velasco

(57) ABSTRACT

Method and apparatus for performing two independent sum-of-absolute-difference (SAD) operations when receiving a single instruction (505, 705) is provided. The two operations may be performed in parallel. The operations process values stored in two source registers (405, 410) and the results are stored to a destination register (425). The source and destination registers each have two independently accessible sections, whereby a first SAD operation (401) can access a first section while a second independent SAD operation (402) can simultaneously access a second section of the register. The first SAD operation is performed on values in a first section of the source registers, the result being stored to a first section of the destination register. The second SAD operation is performed on values in a second section of the source registers, the result being stored to a second section of the destination register. The values may comprise pixel values.

31 Claims, 10 Drawing Sheets

OTHER PUBLICATIONS

Takashi Miyazaki, Video Codec Implementation on Programmable Processors, The Transactions of the Institute of Electronics, Information and Communication Engineers, The Engineering Sciences Society, The Institute of Electronics, Information and Communication Engneers, vol. J83-A No. 12 pp. 1339-1348, Dec. 25, 2000.

Translation of Office Action in Japanese application 2009-510124 corresponding to U.S. Appl. No. 11/431,301 , citing JP2005070938 and Miyazaki_Video_Codec_vol._J83A_pp._1339_1348_2000_12_25 dated Jan. 18, 2011.

* cited by examiner

COMPILER INTRINSICS:
Rdd=vrsadub (Rss, Rtt)                    Word64 Q6_P_vrsadub_PP (Word64 Rss, Word64 Rtt)
Rxx+=vrsadub (Rss, Rtt)                   Word64 Q6_P_vrsadubacc_PP (Word64 Rxx, Word64 Rss, Word64 Rtt)

ENCODING:

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| ICLASS | | | | d32,s32 | | | x | uns | rndac | 1 | 0 | sS | | | | | Parse | | sat | | | 0 | 1 | 1 | 0 | dS | | | | | | |
| 1 | 1 | 1 | 0 | 0 | 0 | 0 | x | 0 | 1 | 1 | 0 | s | s | s | s | s | 0 | 0 | t | t | t | t | t | 0 | 1 | 1 | 0 | d | d | d | d | d | Rdd=vrsadub(Rss,Rtt) |
| ICLASS | | | | d32,s32 | | | x | uns | rndac | 1 | 0 | sS | | | | | Parse | | sat | | | 0 | 1 | 1 | 0 | xS | | | | | | |
| 1 | 1 | 1 | 0 | 1 | 0 | 1 | x | 0 | 1 | 1 | 0 | s | s | s | s | s | 0 | 0 | t | t | t | t | t | 0 | 1 | 1 | 0 | x | x | x | x | x | Rxx+=vrsadub(Rss,Rtt) |

| FIELD NAME | DESCRIPTION |
|---|---|
| ICLASS: | Instruction Class |
| x: | Destination is Src/Dest or Dest |
| d32: | Register D is 32b or 64b |
| rndac: | Round or Nac |
| s32: | Register S is 32b or 64b |
| sa: | Shift Amount |
| sat: | Saturate |
| uns: | Unsigned |
| Parse: | Packet/Loop parse bits |
| dS: | Field to encode register d |
| sS: | Field to encode register s |
| tS: | Field to encode register t |
| xS: | Field to encode register x |

INSTRUCTION FOR PRODUCING TWO INDEPENDENT SUMS OF ABSOLUTE DIFFERENCES

BACKGROUND

1. Field

The present embodiments relates generally to an instruction for producing two independent sums of absolute differences.

2. Background

Currently, motion estimation is a widely used method for encoding/compressing video information. In block-based motion estimation, each video frame is partitioned into blocks (pixel arrays), such as blocks of 16×16, 8×8, or 4×4 pixels. FIG. 1 is a conceptual diagram of a motion estimation method. As shown in FIG. 1, for a current block 110 of a current frame 105, a search is performed in a search area 120 of a reference frame 115 (e.g., the frame prior to or after the current frame) for a block it best matches (in terms of pixel values). When the best matching block 125 is found in the reference frame 115, a motion vector 130 (indicating the displacement of the best matching block 125 in relation to the current block 110) and the pixel value differences with the current block 110 are used to encode the current block. This process is repeated for each block of the current frame.

Techniques for determining the block in the reference frame that best matches the current block typically use a criterion (such as mean absolute error (MAE) or mean absolute difference (MAD) criterion) which is determined using sum-of-absolute-differences (SAD) operations. In these techniques, the sum-of-absolute-differences of pixel values between the current block and each block in the search area of the reference frame is computed. A SAD operation performed on a current block having pixels values $A_i$ and a reference block having pixels values $B_i$, can be represented by the equation:

$$\Sigma |A_i - B_i| = C.$$

A SAD operation is performed for each reference block in the search area and the reference block having the lowest SAD value (C) is selected as the best matching block. However, the large number of SAD operations required in motion estimation is computationally intensive and can consume a large amount of processing time and resources. As such, there is a need for an efficient way to perform SAD operations.

SUMMARY

Some aspects disclosed provide a method and apparatus for performing two independent SAD operations when receiving a single SAD instruction. In some embodiments, the two independent SAD operations are performed in parallel. The SAD operations operate on source values stored in two source registers where the two sum results of the operations are loaded to a destination register. In some embodiments, the source and destination registers each comprise a pair of aligned registers, the first register in the pair being referred to as a first section and the second register in the pair being referred to as a second section of the source or destination register. In some embodiments, each section (register) of a pair of aligned registers is independently accessible so that a first SAD operation can access a first section (register) of the source or destination register while a second independent SAD operation can simultaneously (in parallel) access a second section of the source or destination register.

The first SAD operation is performed on a first set of values stored in a first section of the first source register and a second set of values stored in a first section of the second source register. The result of the first SAD operation is then stored to a first section of the destination register. The second SAD operation is performed on a third set of values stored in a second section of the first source register and a fourth set of values stored in a second section of the second source register. The result of the second SAD operation is then stored to a second section of the destination register.

In some embodiments, the values processed by the two independent SAD operations are pixel values of blocks of a video frame. In some embodiments, the two independent SAD operations are used for video compression or motion estimation.

BRIEF DESCRIPTION OF THE DRAWINGS

FIG. 8 is a table showing compiler intrinsics and encoding that may be used to implement a SAD instruction in hardware;

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
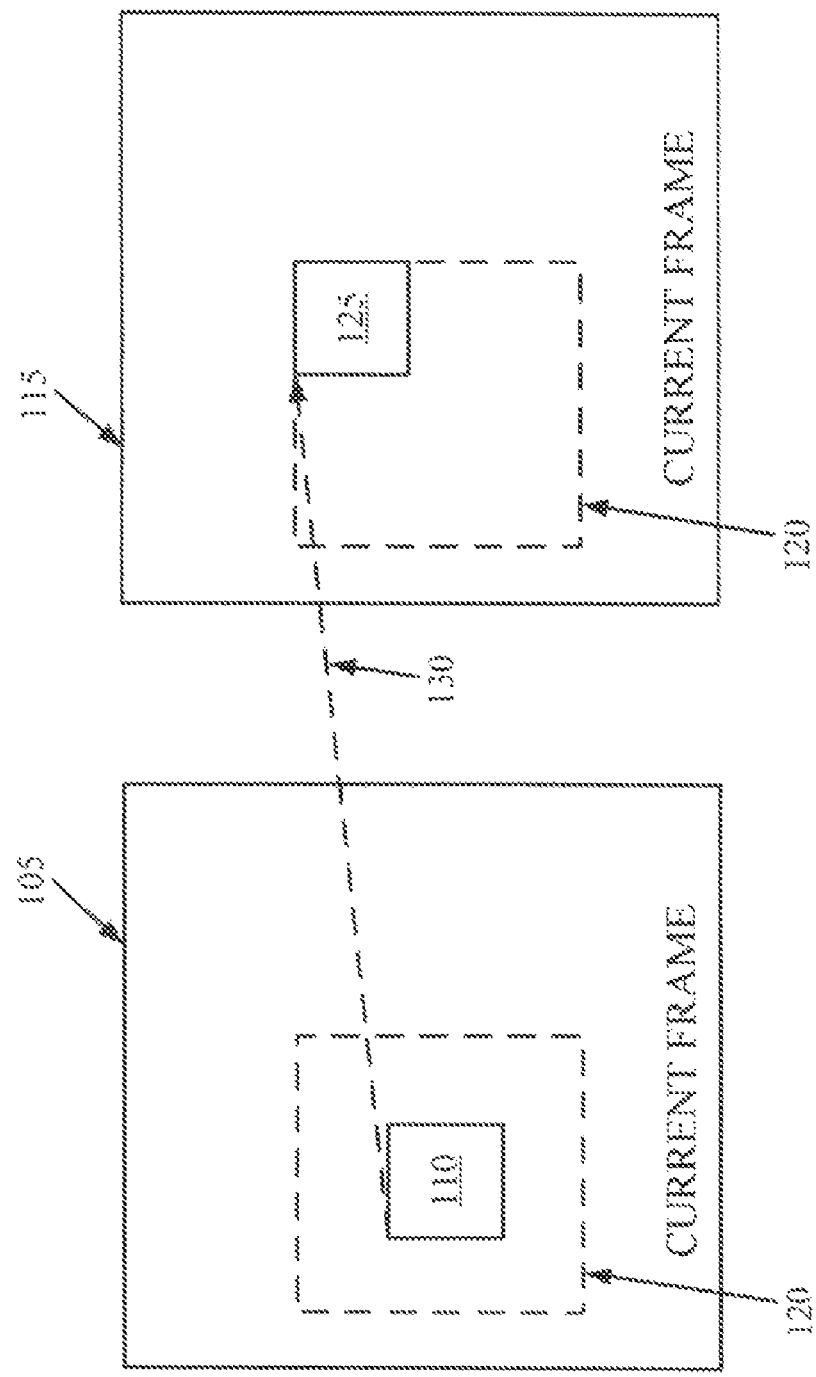
FIG. 1 is a conceptual diagram of a motion estimation method.
Figure 2:
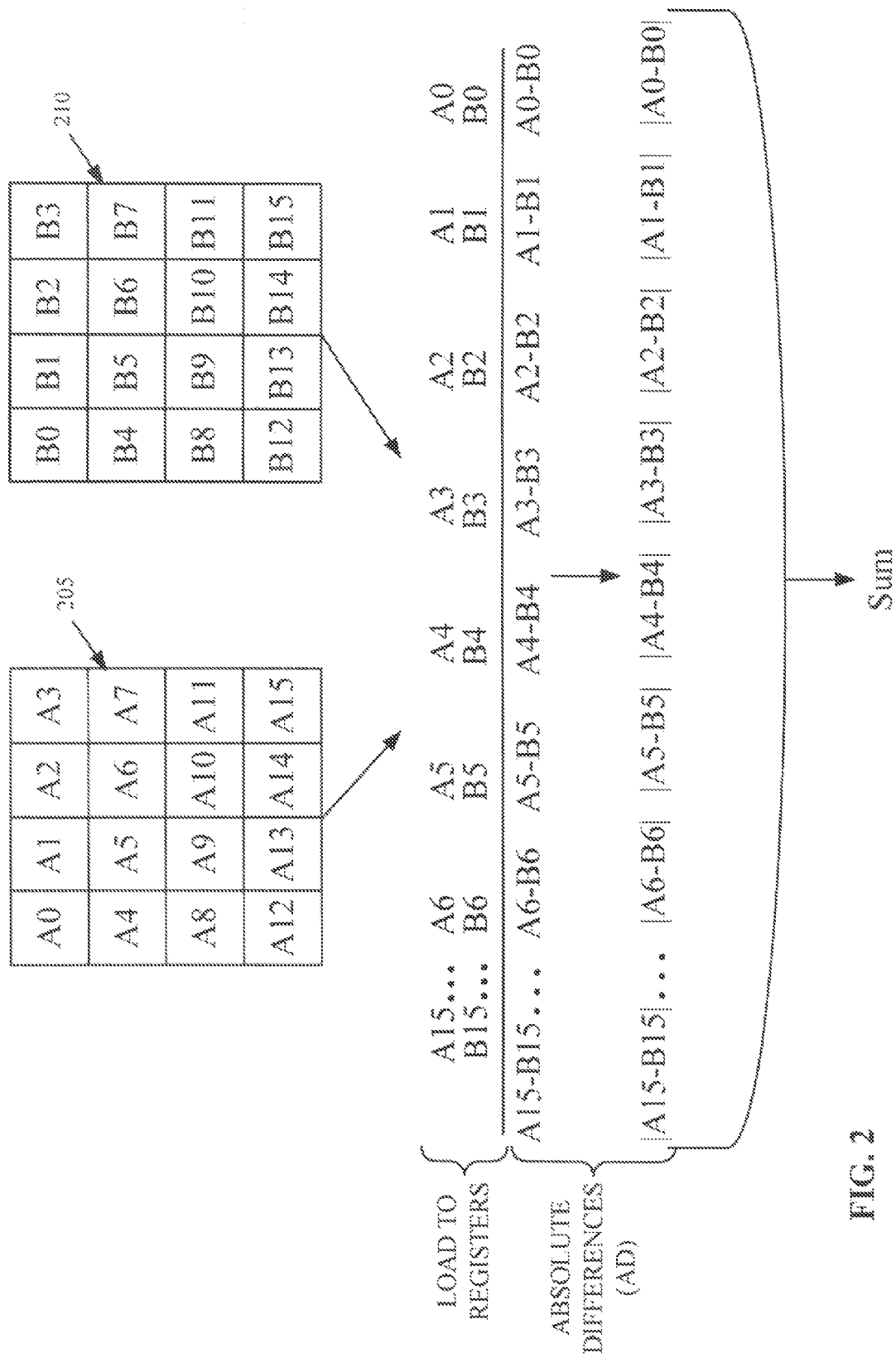
FIG. 2 shows a conceptual diagram of a SAD operation performed on a current block and a reference block.

FIG. 2 shows a conceptual diagram of a SAD operation performed on a current block 205 of a current frame and a reference block 210 of a reference frame. In the example of FIG. 2, a block of a frame comprises a 4×4 pixel array, each pixel comprising a 1 byte pixel value. In other embodiments, a block comprises a different sized pixel array, each pixel comprising a different sized pixel value.

As shown in FIG. 2, the current block 205 comprises a plurality of pixels A0-A15 and the reference block 210 comprises a plurality of pixels B0-B15. A SAD operation performed on the current and reference blocks first determines a difference between pixel values of corresponding pixels of the current and reference blocks 205 and 210 (i.e., A0-B0, A1-B1, A2-B2, ... A15-B15). The SAD operation then determines a set of absolute differences comprising the absolute differences between pixel values of corresponding pixels of the current and reference blocks 205 and 210 (i.e., |A0-B0|, |A1-B1|, |A2-B2|, . . . |A15-B15|). Finally, the SAD operation determines the sum the set of absolute differences (i.e., |A0-B0|+|A1-B1|+|A2-B2| . . . +|A15-B15|).

As used herein, a SAD operation is performed on a first set of values comprising at least two values (e.g., pixel values A0 and A1) and a second set of values comprising at least two values (e.g., pixel values B0 and B1), the SAD operation determining a set of absolute differences comprising at least two absolute differences between particular values of the first and second sets of values (e.g., |A0-B0| and |A1-B1|) and a sum of the set of at least two absolute differences (e.g., |A0-B0|+|A1-B1|). In some embodiments, the first and second sets of values each comprise more than two values (e.g., pixel values A0-A15 and B0-B15). A SAD operation performed on a first set of values $A_i$ and a second set of values $B_i$, can be represented by the equation:

$$\Sigma |A_i - B_i| = C$$

where C represents the result (i.e., the produced value) of the SAD operation.

A SAD operation performed for motion estimation is typically implemented through software or hardware (e.g., a central processing unit, microprocessor, digital signal processor, or the like). Depending on how the software or hardware is configured to compare a current block to a plurality of reference blocks using SAD operations, block comparison may be done in series or parallel. In series block comparison, pixels of a current block are compared to all corresponding pixels of a first reference block before comparisons to any pixels of a second reference block begin.

An example of a series block comparison is illustrated in FIG. 2 where all pixel values (A0-A15) from the current block 205 are compared to all pixel values (B0-B15) from the reference block 210 before comparison to pixel values from another reference block begins. Pixel values (A0-A15) from the current block 205 and pixel values (B0-B15) from the reference block 210 are loaded from memory to registers to complete processing of the reference block before any pixel values from another reference block are loaded from memory to the registers (although two or more load cycles would typically be needed depending on the size of the registers).

In other embodiments, a parallel block comparison may be performed whereby a first sub-set of pixels (e.g., first row of pixels) of a current block are compared to a corresponding sub-set of pixels (e.g., first row of pixels) of a first reference block and also concurrently compared to a corresponding sub-set of pixels (e.g., first row of pixels) of a second reference block. A next sub-set of pixels (e.g., second row of pixels) of the current block are then compared to a corresponding next sub-set of pixels (e.g., second row of pixels) of the first reference block and also concurrently compared to a corresponding next sub-set of pixels (e.g., second row of pixels) of a second reference block, and so on until each pixel of the current and first and second reference blocks are processed. Thus, in parallel block comparison, a comparison between a current block and two or more reference blocks can be performed in parallel. Note that in parallel block comparison, data retrieval times may be reduced as there are fewer data retrieval from memory. For example values A0-A3 are retrieved once and used in two SAD operations (whereas in series block comparison, values A0-A7 are retrieved which requires a longer retrieval time).

Figure 3:
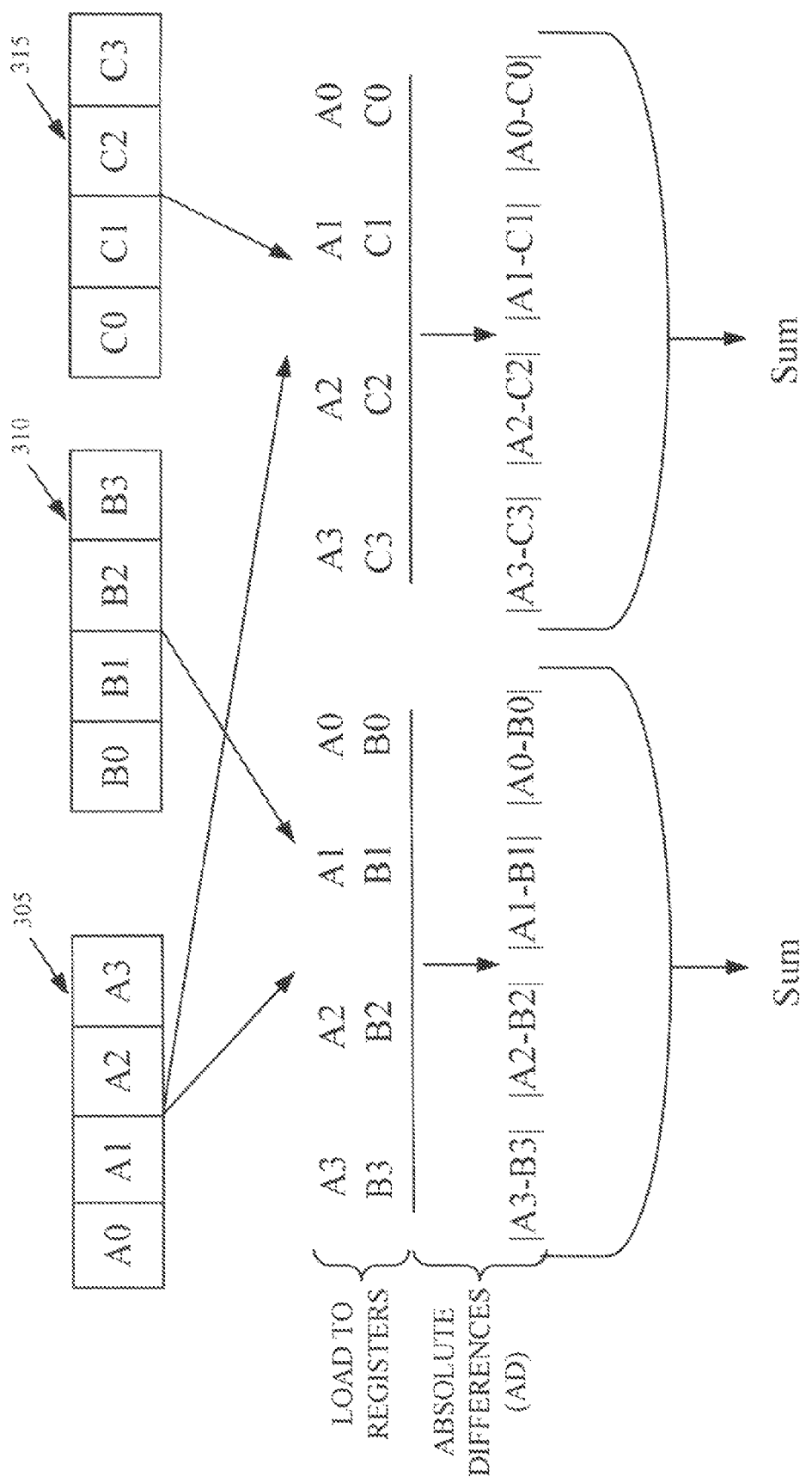
FIG. 3 shows a conceptual diagram of parallel block processing.

FIG. 3 shows a conceptual diagram of parallel block processing where a first SAD operation is performed on a first row 305 (comprising pixels A0-A3) of a current block, and a first row 310 (comprising pixels B0-B3) of a first reference block and a second SAD operation is performed on a first row of the current block 305 and a first row 315 (comprising pixels C0-C3) of a second reference block. In some embodiments, the first and second SAD operations are performed in parallel. In the example of FIG. 3, a block of a frame comprises a 4×4 pixel array, each row in the array comprising 4 pixels, each pixel comprising a 1 byte pixel value. In other embodiments, a block comprises a different sized pixel array, each row in the array comprising a different number of pixels, each pixel comprising a different sized pixel value.

Pixel values (A0-A3) from the current block 205 and pixel values (B0-B3 and C0-C3) from the first and second reference blocks are typically loaded to registers for processing. The first SAD operation performed on the first row 305 of the current block and the first row 310 (comprising pixels B0-B3) of the first reference block comprises determining absolute differences between corresponding pixels (i.e., |A0-B0|, |A1-B1|, |A2-B2|, and |A3-B3|) and summing the absolute differences (i.e., |A0-B0|+|A1-B1|+|A2-B2|+|A3-B3|). The second SAD operation performed on the first row 305 of the current block and the first row 315 (comprising pixels C0-C3) of the second reference block comprises determining absolute differences between corresponding pixels (i.e., |A0-C0|, |A1-C1|, |A2-C2|, and |A3-C3|) and summing the absolute differences (i.e., |A0-C0|+|A1-C1|+|A2-C2|+|A3-C3|). Third and fourth SAD operations would be then be performed on the second row of pixels for the current and first and second reference blocks, and so on until all pixels of the current block are processed.

Regardless of whether a current block is compared to reference blocks in series or in parallel using SAD operations, motion estimation can be optimized if SAD operations can be performed efficiently with reduced use of processing time and resources. In some embodiments, two independent SAD operations are performed in parallel using a destination register for storing the results of the two independent SAD operations. In some embodiments, a single instruction is used to specify the two independent SAD operations, where execution of the single instruction produces two independent SAD results.

Figure 4:
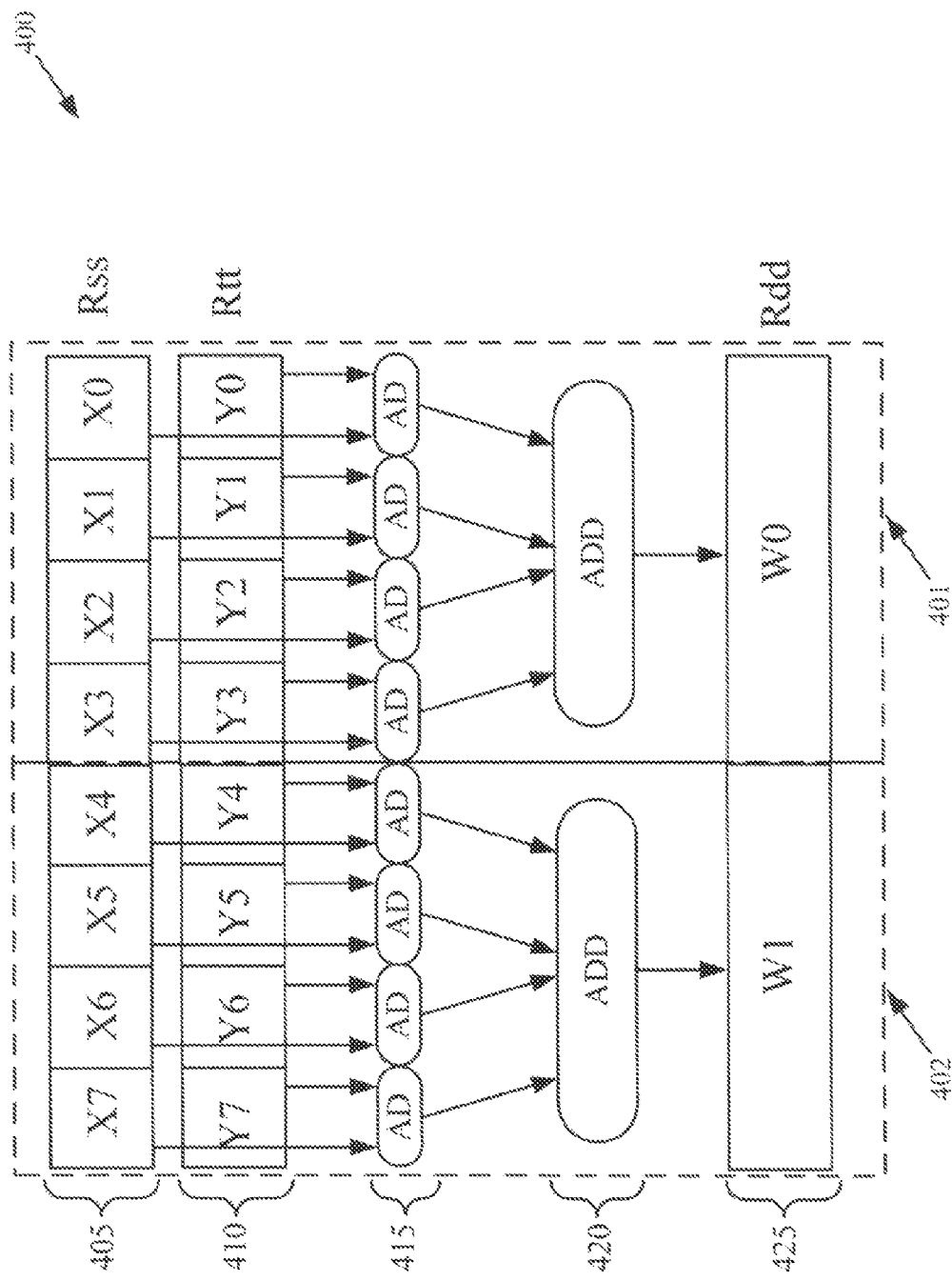
FIG. 4 shows a conceptual diagram of a computer architecture where two independent SAD operations are performed in parallel.

FIG. 4 shows a conceptual diagram of a computer architecture 400 where two independent SAD operations 401 and 402 are performed in parallel using two source registers and a destination register. Note that FIG. 4 is for illustration purposes only and illustrates separate steps of a SAD operation. In other embodiments, a SAD operation is not executed with a plurality of steps (as shown in FIG. 4) but is executed in a single step. As shown in FIG. 4, the two SAD operations 401 and 402 are performed on values X0-X7 loaded to a first source register Rss 405 and values Y0-Y7 loaded to a second source register Rtt 410. As referred to herein, input values (e.g., X0-X7 and Y0-Y7) processed by a SAD operation are referred to as source values. Each value in a source register has a particular ordering or position (a first value, a second value, etc.) relative to the other values in the source register. A particular value in the first source register and a particular value in the second source register are considered "corresponding values" if they have the same ordering or position in the first and second source registers. For example, a first value in the first source register and a first value in the second source register are corresponding values. The results of the two SAD operations 401 and 402 are loaded to a destination register Rdd 425.

The SAD operations 401 and 402 may be used in series block processing (e.g., where values X0-X7 are equal to values A0-A7 and values Y0-Y7 are equal to values B0-B7 of FIG. 2). The SAD operations 401 and 402 may also be used in parallel block processing (e.g., where values X0-X3 are equal to values A0-A3, values X4-X7 are also equal to values A0-A3, values Y0-Y3 are equal to values C0-C3, and values Y4-Y7 are equal to values B0-B3 of FIG. 3). In other embodiments, the SAD operations 401 and 402 are used in other types of processing. In some embodiments, the SAD operations 401 and 402 operate on values comprising two vectors and produce a scalar value result.

The first SAD operation 401 is performed on a first set of values X0-X3 stored in a first section of the first source register Rss 405 and a second set of values Y0-Y3 stored in a first section of the second source register Rtt 410. The first SAD operation 401 comprises determining a first set of absolute differences comprising the absolute differences between corresponding values in the first and second set of values stored in the first sections of the first and second source registers (i.e., |X0-Y0|, |X1-Y1|, |X2-Y2|, and |X3-Y3|) and summing the first set of absolute differences (i.e., |X0-Y0|+|X1-Y1|+|X2-Y2|+|X3-Y3|). The sum result of the first SAD operation 401 is stored in a first section (W0) of the destination register Rdd 425.

The second SAD operation 402 is performed on a third set of values X4-X7 stored in a second section of the first source register Rss 405 and a fourth set of values Y4-Y7 stored in a second section of the second source register Rtt 410. The second SAD operation 402 comprises determining a second set of absolute differences comprising the absolute differences between corresponding values in the third and fourth set of values stored in the second sections of the first and second source registers (i.e., |X4-Y4|, |X5-Y5|, |X6-Y6|, and |X7-Y7|) and summing the second set of absolute differences (i.e., |X4-Y4|+|X5-Y5|+|X6-Y6|+|X7-Y7|). The sum result of the second SAD operation 402 is stored in a second section (W1) of the destination register Rdd 425.

In some embodiments, the processing steps illustrated in FIG. 4 are implemented by an execution unit having components (such as arithmetic logic units) configured to perform the processing steps described above. For example, a plurality of AD components 415 may be configured to perform absolute difference (AD) operations and a plurality of Add components 420 may be configured to perform addition operations. In other embodiments, the processing steps illustrated in FIG. 4 are implemented by an execution unit contained within an arithmetic logic unit.

In some embodiments, the architecture of the registers used by the execution unit to perform operations is such that one or more registers can be accessed as single registers or as aligned register pairs. For example, the registers may comprise a plurality of 32-bit registers that can be accessed as single registers or as aligned 64-bit register pairs so that an instruction can operate on 32-bit or 64-bit values. In some embodiments, the source and destination registers (Rss, Rtt, and Rdd) each comprise a pair of aligned registers, the first register in the pair being referred to as a first section and the second register in the pair being referred to as a second section of the source or destination register. In some embodiments, each section (register) of a pair of aligned registers is independently accessible so that a first SAD operation can access a first section (e.g., to retrieve and process values stored in the first section or load values to the first section) of the source or destination register while a second independent SAD operation can simultaneously (in parallel) access a second section (e.g., to retrieve and process values stored in the first section or load values to the second section) of the source or destination register. In some embodiments, the first SAD operation accesses/uses a first section of two source registers and a destination register and the second SAD operation accesses/ uses a second section of the two source registers and the destination register, the first and second sections of each register being independently accessible.

For example, suppose that each value (X0-X7 and Y0-Y7) in the first and second source registers Rss and Rtt comprises 1 byte so that the first and second source registers Rss and Rtt are 64-bit (double word) aligned register pairs and each Add component 420 is a 32-bit adder. As such, the first SAD operation accesses values X0-X3 stored in a first 32-bit (single word) section/register of the first source register Rss and accesses values Y0-Y3 stored in a first 32-bit (single word) section/register of the second source register Rtt. In addition, the second SAD operation simultaneously accesses values X4-X7 stored in a second 32-bit section/register of the first source register Rss and accesses values Y4-Y7 stored in a second 32-bit section/register of the second source register Rtt. The destination register Rdd would be a 64-bit (double word) aligned register pair. The sum result of the first SAD operation is stored to a first 32-bit section/register ("W0" for word 0) and the sum result of the second SAD operation is stored to a second 32-bit section/register ("W1" for word 1) of the destination register Rdd.

Figure 5:
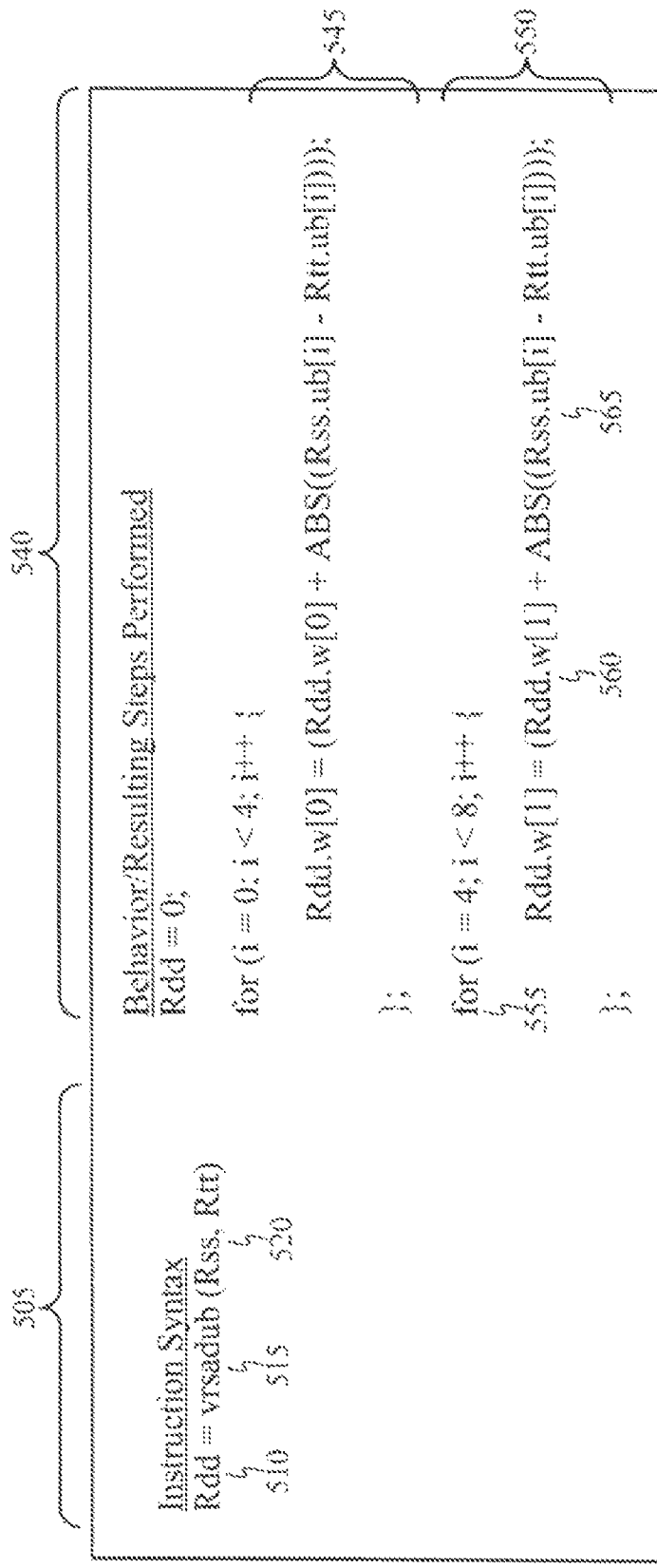
FIG. 5 shows instruction syntax of a single SAD instruction producing two independent SAD results in the computer architecture shown in FIG. 4.

In some embodiments, the two independent SAD operations illustrated in FIG. 4 are specified by a single SAD instruction. FIG. 5 shows instruction syntax 505 of a single SAD instruction producing two independent SAD results in the computer architecture 400 shown in FIG. 4. FIG. 5 also shows the behavior/resulting steps 540 caused when the single SAD instruction is received and executed (e.g., by an execution unit of a processor).

The instruction syntax 505 includes an instruction identifier 510 (e.g., "sad") specifying a SAD operation. The instruction syntax 505 also includes a destination register identifier 515 (e.g., Rdd) that identifies the register where the two independent SAD results are stored and two source register identifiers 520 (e.g., Rss and Rtt) identifying two registers where the source values to be processed by the two SAD operations are stored. In some embodiments, the instruction syntax 505 may further include identifiers that characterize the source values (inputs) or produced values (output) of the SAD operations. For example, "vr" (for "vector reduced") may be used to indicate that the source values comprise two vectors and the produced result is a scalar value. As a further example, "ub" (for "unsigned byte") may be used to indicate that the source values comprise unsigned byte values.

The processes caused by the execution of the single SAD instruction is described in the behavior/resulting steps 510 section of FIG. 5. The resulting steps include initialization of the destination register (Rdd=0), a first set of steps 545 for processing values stored in a first section of the source registers, and a second set of steps 550 for processing values stored in a second section of the source registers. The first and second sets of processing steps each include an absolute difference operation 565, a summing of the absolute differences into a destination register 560, and the repeating of operations 555 (for a particular number of iterations). In some embodiments, the first and second sets of processing steps are performed in parallel.

For example, the first set of processing steps 545 include determining the absolute difference of values stored in a first section (at bytes 0 through 3) of the source registers Rss and Rtt ("ABS((Rss.ub[i]-Rtt.ub[i])"), summing the absolute differences into a first section (W0) of the destination register ("Rdd.w[0]=(Rdd.w[0]+ABS((Rss.ub[i]-Rtt.ub[i])))"), and repeating the operations for a particular number of iterations ("for i=0; i<4; i++"). The second set of processing steps 550 include determining the absolute difference of values stored in a second section (at bytes 4 through 7) of the source registers Rss and Rtt ("ABS((Rss.ub[i]-Rtt.ub[i])"), summing the absolute differences into a second section (W1) of the destination register ("Rdd.w[1]=(Rdd.w[1]+ABS ((Rss.ub[i]-Rtt.ub[i])))"), and repeating the operations for a particular number of iterations ("for i=4; i<8; i++").

Figure 6:
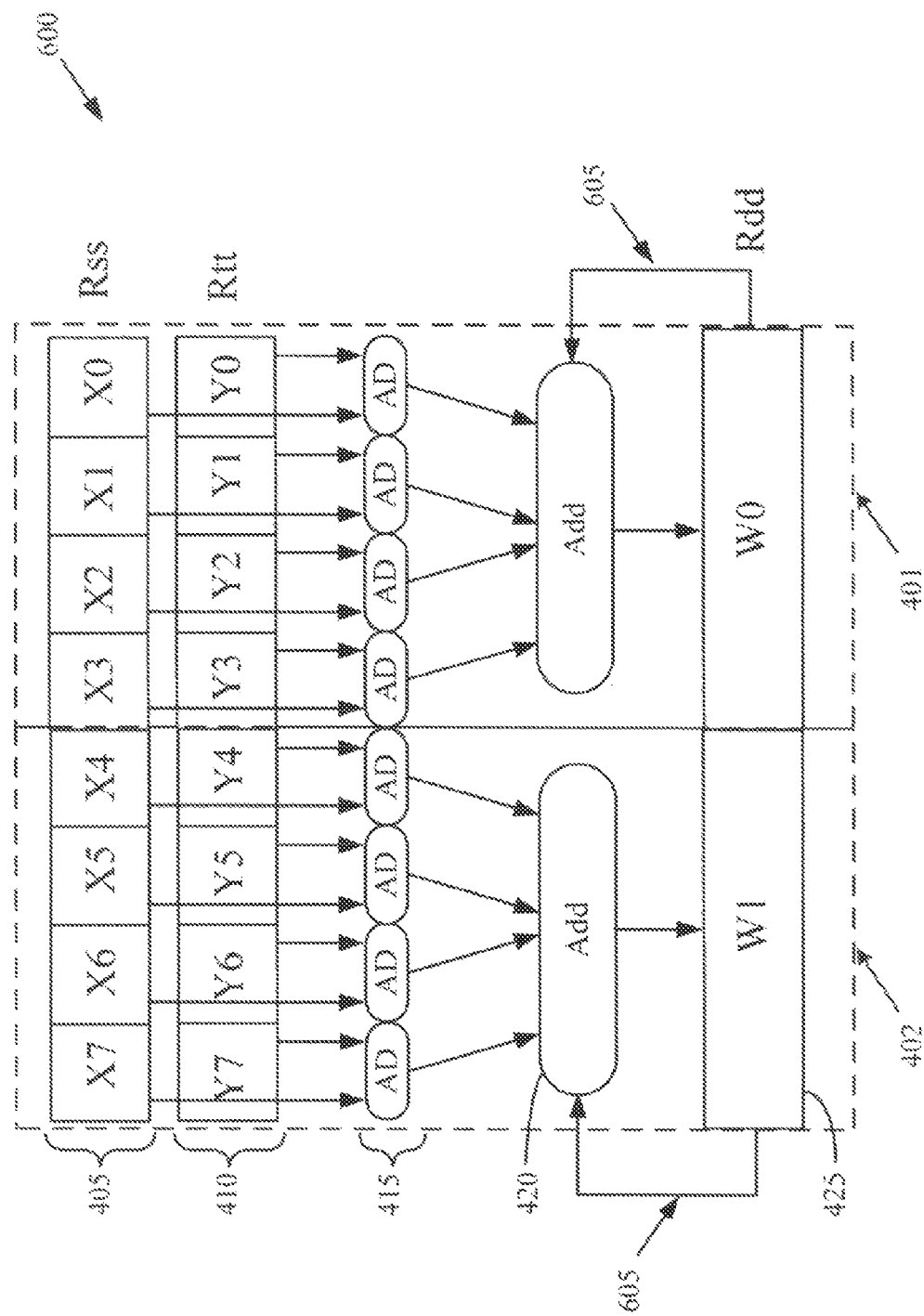
FIG. 6 shows a conceptual diagram of an alternative computer architecture where two independent SAD operations are performed in parallel.

FIG. 6 shows a conceptual diagram of an alternative computer architecture 600 where two independent SAD operations are performed in parallel using two source registers Rss and Rtt and a destination register Rdd. Note that FIG. 6 is for illustration purposes only and illustrates separate steps of a SAD operation. In other embodiments, a SAD operation is not executed with a plurality of steps (as shown in FIG. 6) but is executed in a single step.

The alternative computer architecture 600 is similar to the computer architecture 400 of FIG. 4 except that the alternative computer architecture 600 includes an accumulation loop 605 for each SAD operation. The accumulation loop 605 allows for the accumulation of the sum results of two or more SAD operations into a particular section of the destination register Rdd. For example, assume a first SAD operation is performed on source values in the first sections of the two source registers that produces a first sum result which is stored to the first section of the destination register. Then afterwards, new source values are loaded to the first sections of the two source registers and a second SAD operation is performed on the new source values to produce a second sum result. The accumulation loop 605 allows the second sum result to be accumulated/added with the first sum result that is stored in the first section of the destination register. The accumulated sum (first sum+second sum) are then stored back to the same first section of the destination register. Note that the Add components 420 in the alternative computer architecture 600 also receives an input from the destination register Rdd.

As such, through use of the accumulation loop 605, a current sum result of a current SAD operation can be added/accumulated with one or more prior sum results (typically comprising non-zero values) of one or more prior SAD operations. In some embodiments, the sum result of a current SAD operation is added/accumulated with a non-zero value in a particular section of the destination register (the non-zero value comprising one or more prior sum results of one or more prior SAD operations), where the accumulated sum (current sum+one or more prior sums) is then stored back to the same section of the destination register.

Figure 7:
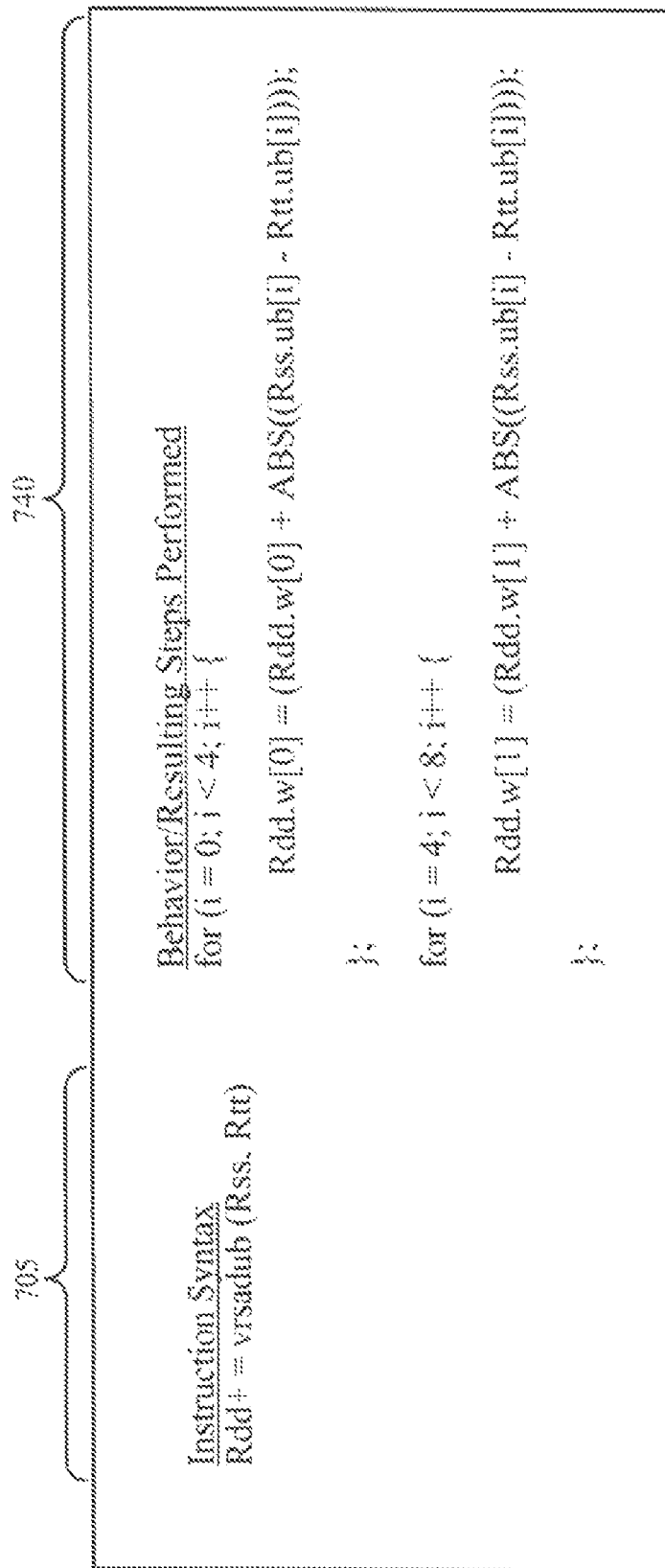
FIG. 7 shows instruction syntax of a single SAD instruction producing two independent SAD results in the alternative computer architecture shown in FIG. 6.

FIG. 7 shows instruction syntax 705 of a single SAD instruction producing the two independent SAD results in the alternative computer architecture 600 shown in FIG. 6. FIG. 7 also shows the behavior/resulting steps 740 caused when the single SAD instruction is received and executed (e.g., by an execution unit of a processor). Note that in the instruction syntax 705 for the alternative computer architecture 600 of FIG. 6, three inputs from values in registers Rss, Rtt and Rdd are required. This is in contrast to the instruction syntax 505 for the computer architecture 400 of FIG. 4, which requires only two inputs (from values in registers Rss and Rtt). Also note that in the resulting steps 540 of the instruction syntax 505, the destination register is initialized to zero (Rdd=0) since the resulting steps 540 of the instruction syntax 505 do not accumulate sums of current and prior SAD operations. In the resulting steps 740 of the instruction syntax 705, however, the destination register is not initialized to zero since the destination register may hold a sum of one or more prior SAD operations and the resulting steps 740 of the instruction syntax 705 accumulates sums of current and prior SAD operations.

The accumulation of sums is especially beneficial in block comparison where the total sum of absolute differences of all pixels of a current block and a reference block is needed. Multiple SAD operations are needed for each block comparison since a single SAD operation can typically only process a portion of the current and reference blocks. For example, for current and reference blocks having four rows of pixels, four SAD operations are typically needed to compare the current and reference blocks (one SAD operation for each row). Therefore, a total sum of the results of the four SAD operations (i.e., the accumulation of the four sum results) must be determined. The accumulation loop 605 allows the sum results of separate SAD operations performed on the same current and reference blocks to be accumulated after each SAD operation. As such, the sum results of the separate SAD operations do not need to be later added together through separate instructions.

FIG. 8 is a table showing compiler intrinsics and encoding that may be used to implement the SAD instruction in hardware. The compiler intrinsics is useful for a programmer when writing code in a high-level language (such as C language). The programmer can use the compiler intrinsics to instruct a compiler to use an instruction corresponding to Rdd=vrsadub (Rss, Rtt) or Rxx+=vrsadub (Rss, Rtt) (as shown in FIG. 8) at the assembly level. The encoding may be used to design an instruction unit of processor (e.g., digital signal processor). In other embodiments, different compiler intrinsics and encoding is used to implement the SAD instruction in hardware.

Figure 9:
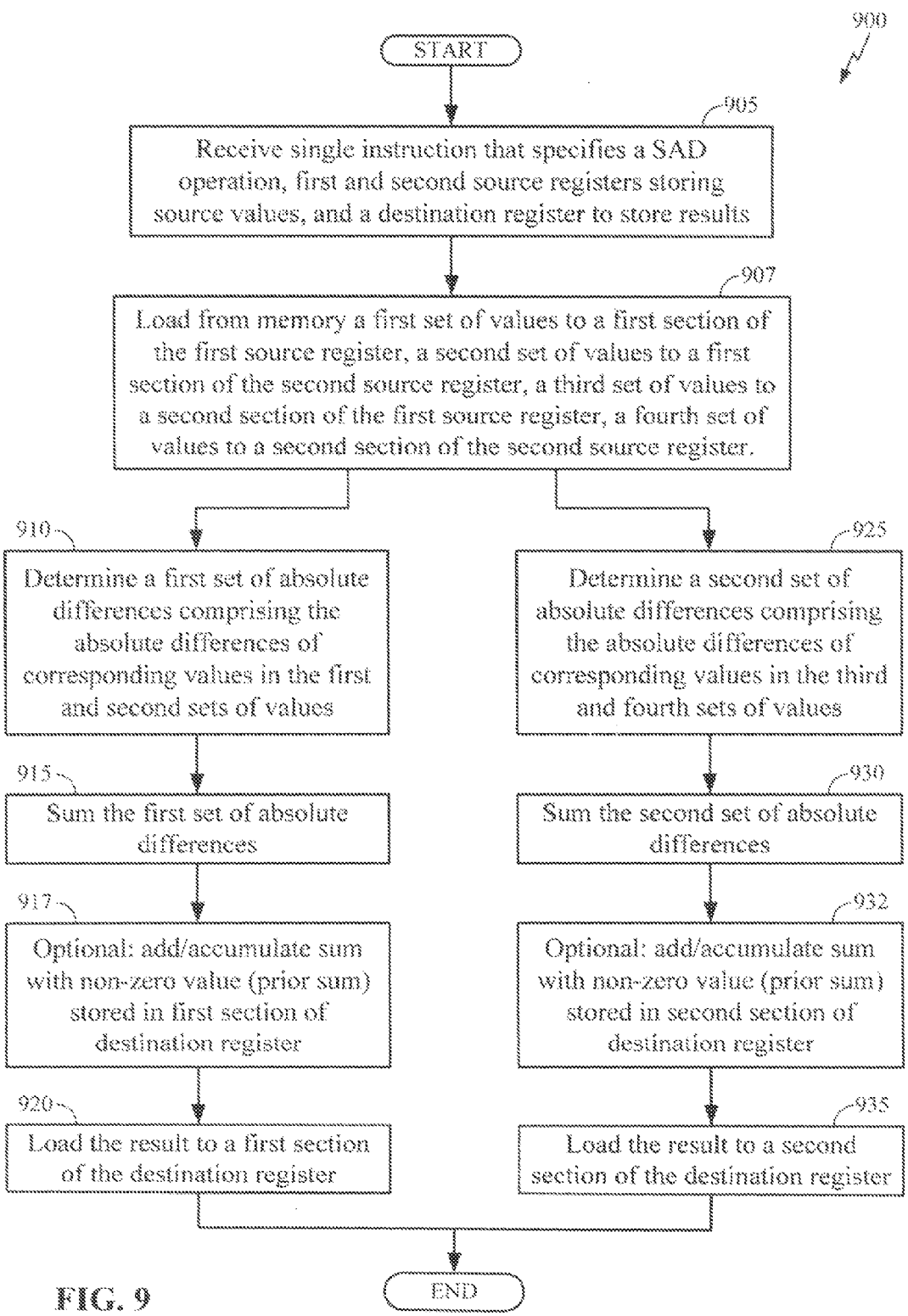
FIG. 9 is a flowchart of a method for performing two independent SAD operations in parallel using two source registers and a destination register.

FIG. 9 is a flowchart of a method 900 for performing two independent SAD operations in parallel using two source registers and a destination register. In some embodiments, some steps of the method 900 are implemented in software or hardware (e.g., by a execution unit of a processor). The steps of the method 900 are for illustrative purposes only and the order or number of steps may vary or be interchanged in other embodiments.

The method 900 begins when a single SAD instruction is received (at 905), the instruction specifying a SAD operation, first and second source registers storing source values, and a destination register to store the SAD operation results (e.g., "Rdd=vrsadub (Rss, Rtt)"). In response to receiving the single SAD instruction, the method 900 then performs two independent SAD operations. To do so, the method loads from memory (at 907) a first set of values (e.g., X0-X3) to a first section of the first source register, a second set of values (e.g., Y0-Y3) to a first section of the second source register, a third set of values (e.g., X4-X7) to a second section of the first source register, and a fourth set of values (e.g., Y4-Y7) to a second section of the second source register. The method then performs a first set of steps (910-920) for performing a first SAD operation on source values stored in the first section of the source registers and a second set of steps (925-935) for performing a second SAD operation on source values stored in the second section of the source registers. In some embodiments, the first and second sets of steps (i.e., the first and second SAD operations) are performed in parallel.

At step 910, the method 900 determines a first set of absolute differences comprising the absolute differences of corresponding values in the first and second sets of values stored in the first sections of the first and second source registers. The method then sums (at 915) the first set of absolute differences. Optionally, the method then adds/accumulates (at 917) the sum of the first set of absolute differences with one or more prior sums (typically a non-zero value) of one or more prior SAD operations that is stored in a first section of destination register. The method then loads (at 920) the sum or accumulation result to the first section of the destination register.

At step 925, the method 900 determines a second set of absolute differences comprising the absolute differences of corresponding values in the third and fourth sets of values stored in the second sections of the first and second source registers. The method then sums (at 930) the second set of absolute differences. Optionally, the method then adds/accumulates (at 932) the sum of the second set of absolute differences with one or more prior sums (typically a non-zero value) of one or more prior SAD operations that is stored in a second section of destination register. The method then loads (at 935) the sum or accumulation result to the second section of the destination register. The method then ends.

Figure 10:
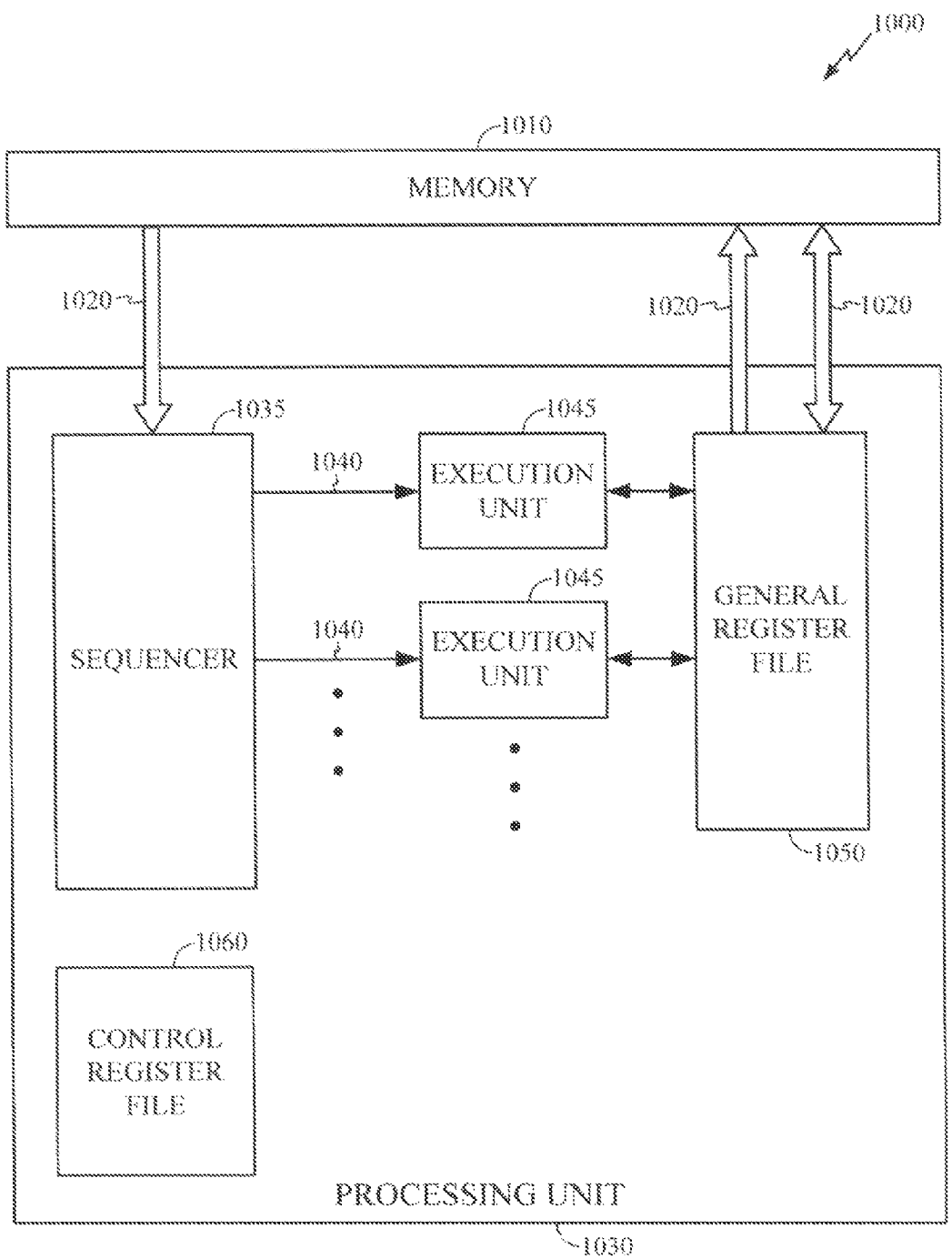
FIG. 10 shows a conceptual diagram of a general computer architecture used in some embodiments.

FIG. 10 shows a conceptual diagram of a general computer architecture 1000 used in some embodiments. The architecture 1000 includes a memory 1010, a processing unit 1030, and one or more buses 1020 coupling the memory 1010 to the processing unit 1030.

The memory 1010 stores data (e.g., pixel values of blocks of a video frame) and instructions, including at least one SAD instruction. Data and instructions have particular addresses in the memory 1010 that are used to retrieve the data or instructions from the memory 1010. Addressing schemes for a memory are well known in the art and not discussed in detail here. Data and/or instructions in the memory 1010 are loaded to the processing unit 1030 via buses 1020.

The processing unit 1030 comprises a sequencer 1035, a plurality of pipelines 1040 for a plurality of execution units 1045, a general register file 1050 (comprising a plurality of general registers), and a control register file 1060. The processing unit 1030 may comprise a central processing unit, microprocessor, digital signal processor, or the like. In some embodiments, the plurality of execution units 1045 includes one or more execution units (referred to as SAD execution units) configured to perform SAD operations. A SAD execution unit comprises components (such as arithmetic logic units) configured to perform the processing steps required for SAD operations (such as a plurality of AD components 415 for performing absolute difference operations and a plurality of Add components 420 for accumulating/summing values). In other embodiments, a SAD execution unit is contained within an arithmetic logic unit.

Typically, each instruction contains information regarding the type of execution unit 1045 needed to process the instruction where each execution unit can typically only process particular types of instructions. The sequencer 1035 receives instructions from the memory 1010, decodes the instructions, determines the appropriate execution unit 1045 for each instruction (using the information contained in the instruction). After making this determination for an instruction, the sequencer 1035 sends a control signal to the appropriate execution unit 1045 and inputs the instruction into the appropriate pipeline 1040 for processing by the appropriate execution unit 1045.

Each execution unit 1045 that receives an instruction performs the instruction using the general register file 1050. As well known in the art, the general register file 1050 comprises an array of registers. Any data (e.g., pixel values) needed to perform an instruction is retrieved from the memory 1010 and loaded to a register in the general register file 1050. After an instruction is performed by an execution unit 1045, the resulting data (e.g., SAD operation results) is stored to the general register file 1050 and then loaded and stored to the memory 1010. Data is loaded to and from the memory 1010 via buses 1020. To execute an instruction, an execution unit 1045 may also use the control register file 1060. Control registers 1060 typically comprise a set of special registers, such as modifier, status, and predicate registers. Control registers 1060 can also be used to store information regarding software or hardware loops, such as a loop count (iteration count).

For example, if the sequencer 1035 receives a SAD instruction, the sequencer 1035 will input the instruction into the appropriate pipeline 1040 for processing by a SAD execution unit 1045. Also, data (e.g., pixel values) required to perform the SAD instruction is loaded to two source registers in the general register file 1050. As such, the SAD instruction causes the processing unit 1030 (using SAD execution units 1045) to perform two independent SAD operations and produce two sum results. The two sum results are stored to a destination register in the general register file 1050 which is then loaded and stored to the memory 1010 via a bus 1020. In some embodiments, the source and destination registers used by the SAD execution unit 1045 each comprise a pair of aligned registers that are independently accessible.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium.

In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A non-transitory computer readable medium storing: a sum-of-absolute-differences (SAD) instruction specifying a first source register, a second source register, and a destination register distinct from the first source register and from the second source register, the destination register to store SAD operation results that, when executed by a processing unit, causes the processing unit to perform two independent SAD operations, the two independent SAD operations including a first SAD operation based on a first pair of corresponding sections of the first source register and the second source register and a second SAD operation based on a second pair of corresponding sections of the first source register and the second source register, wherein each section of the first pair of corresponding sections is different than each section of the second pair of corresponding sections, wherein the first SAD operation is independent of the each section of the second pair of corresponding sections, and wherein the second SAD operation is independent of each section of the first pair of corresponding sections, a result of the first SAD operation being stored in a first section of the destination register and a result of the second SAD operation being stored in a second section of the destination register.

2. The non-transitory computer readable medium of claim 1, wherein the processing unit performs the two SAD operations in parallel.

3. The non-transitory computer readable medium of claim 1, wherein the destination and source registers each comprise a pair of aligned registers.

4. The non-transitory computer readable medium of claim 1, wherein the first source register, the second source register, and the destination register are each divided into two independently accessible sections.

5. The non-transitory computer readable medium of claim 1, wherein:
the processing unit performs the first SAD operation by determining a sum of a first set of absolute differences comprising the absolute differences of corresponding source values stored in the first pair of corresponding sections of the first and second source registers; and
the processing unit performs the second SAD operation by determining a sum of a second set of absolute differences comprising the absolute differences of corresponding source values stored in the second pair of corresponding sections of the first and second source registers.

6. The non-transitory computer readable medium of claim 1, wherein:
source values stored in the first and second source registers comprise pixel values of video frames; and
the first source register stores pixel values of a current block of a current frame and the second source register stores pixel values of two different blocks of a reference frame.

7. The non-transitory computer readable medium of claim 1, wherein the processing unit performs the two independent SAD operations by:
adding a result of another SAD operation stored in the first section of the destination register with the result of the first SAD operation and storing the sum in the first section of the destination register; and
adding a result of another SAD operation stored in the second section of the destination register with the result of the second SAD operation and storing the sum in the second section of the destination register.

8. A method for performing sum-of-absolute-differences (SAD) operations, the method comprising: receiving at a processor, a single SAD instruction specifying a first source register, a second source register, and a destination register of the processor, the destination register distinct from the first source register and from the second source register, the destination register to store SAD operation results; and in response to receiving the single SAD instruction, performing two independent SAD operations, the two independent SAD operations including a first SAD operation based on a first pair of corresponding sections of thee first source register and the second source register and a second SAD operation based on a second pair of corresponding sections of the first source register and the second source register, wherein each section of the first pair of corresponding sections is different than each section of the second pair of corresponding sections, wherein the first SAD operation is independent of the each section of the second pair of corresponding sections, and wherein the second SAD operation is independent of each section of the first pair of corresponding sections, a result of the first SAD operation being stored in a first section of the destination register and a result of the second SAD operation being stored in a second section of the destination register.

9. The method of claim 8, wherein the two SAD operations are performed in parallel.

10. The method of claim 8, wherein the destination and source registers each comprise a pair of aligned registers.

11. The method of claim 8, wherein the first source register, the second source register, and the destination register are each divided into two independently accessible sections.

12. The method of claim 8, wherein:
performing the first SAD operation further comprises determining a sum of a first set of absolute differences comprising the absolute differences of corresponding source values stored in the first pair of corresponding sections of the first and second source registers; and
performing the second SAD operation further comprises determining a sum of a second set of absolute differences comprising the absolute differences of corresponding source values stored in the second pair of corresponding sections of the first and second source registers.

13. The method of claim 8, wherein:
source values stored in the first and second source registers comprise pixel values of video frames; and
the first source register stores pixel values of a current block of a current frame and the second source register stores pixel values of two different blocks of a reference frame.

14. The method of claim 8, wherein performing the two SAD operations comprises:
    adding a result of another SAD operation stored in the first section of the destination register with the result of the first SAD operation and storing the sum in the first section of the destination register; and
    adding a result of another SAD operation stored in the second section of the destination register with the result of the second SAD operation and storing the sum in the second section of the destination register.

15. An apparatus for performing sum-of-absolute-differences (SAD) operations, the apparatus comprising: means for receiving a single SAD instruction specifying a first source register, a second source register, and a destination register distinct from the first source register and from the second source register, the destination register to store SAD operation results; and means for, in response to receiving the single SAD instruction, performing two independent SAD operations, the two independent SAD operations including a first SAD operation based on a first pair of corresponding sections of the first source register and the second source register and a second SAD operation based on a second pair of corresponding sections of the first source register and the second source register, wherein each section of the first pair of corresponding sections is different than each section of the second pair of corresponding sections, wherein the first SAD operation is independent of the each section of the second pair of corresponding sections, and wherein the second SAD operation is independent of each section of the first pair of corresponding sections, a result of the first SAD operation being stored in a first section of the destination register and a result of the second SAD operation being stored in a second section of the destination register.

16. The apparatus of claim 15, wherein the two SAD operations are performed in parallel.

17. The apparatus of claim 15, wherein the single SAD instruction further specifies two source registers storing source values for processing by the two SAD operations, wherein the destination and source registers each comprise a pair of aligned registers.

18. The apparatus of claim 15, wherein the first source register, the second source register, and the destination register are each divided into two independently accessible sections.

19. The apparatus of claim 15, wherein:
    the means for performing the first SAD operation further comprises means for determining a sum of a first set of absolute differences comprising the absolute differences of corresponding source values stored in the first pair of corresponding sections of the first and second source registers; and
    the means for performing the second SAD operation further comprises means for determining a sum of a second set of absolute differences comprising the absolute differences of corresponding source values stored in the second pair of corresponding sections of the first and second source registers.

20. The apparatus of claim 15, wherein:
    source values stored in the first and second source registers comprise pixel values of video frames; and
    the first source register stores pixel values of a current block of a current frame and the second source register stores pixel values of two different blocks of a reference frame.

21. The apparatus of claim 15, wherein the means for performing the two SAD operations comprises:
    means for adding a result of another SAD operation stored in the first section of the destination register with the result of the first SAD operation and storing the sum in the first section of the destination register; and
    means for adding a result of another SAD operation stored in the second section of the destination register with the result of the second SAD operation and storing the sum in the second section of the destination register.

22. An apparatus for performing sum-of-absolute-differences (SAD) operations, the apparatus comprising:
    a memory for storing at least one SAD instruction specifying a first source register, a second source register, and a destination register distinct from the first source register and the second source register, the destination register to store SAD operation results; and
    a processing unit coupled to the memory, the processing unit being configured to perform two independent SAD operations upon receiving a single SAD instruction, the two independent SAD operations including a first SAD operation based on a first pair of corresponding sections of the first source register and the second source register and a second SAD operation based a second pair of corresponding sections of the first source register and the second source register, wherein each section of the first pair of corresponding sections is different than each section of the second pair of corresponding sections, wherein the first SAD operation is independent of each section of the second pair of corresponding sections, and wherein the second SAD operation is independent of each section of the first pair of corresponding sections, the processing unit comprising:
    one or more execution units configured to perform SAD operations; and
    a set of registers comprising the first source register, the second source register and the destination register, wherein a result of the first SAD operation is stored in a first section of the destination register and a result of the second SAD operation is stored in a second section of the destination register.

23. The apparatus of claim 22 wherein the processing unit is configured to perform the two independent SAD operations in parallel.

24. The apparatus of claim 22, wherein the destination and source registers each comprise a pair of aligned registers.

25. The apparatus of claim 22, wherein the first source register, the second source register, and the destination register are each divided into two independently accessible sections.

26. The apparatus of claim 22, wherein:
    the processing unit is configured to perform the first SAD operation by determining a sum of a first set of absolute differences comprising the absolute differences of corresponding source values stored in the first pair of corresponding sections of the first and second source registers; and
    the processing unit is configured to perform the second SAD operation by determining a sum of a second set of absolute differences comprising the absolute differences of corresponding source values stored in the second pair of corresponding sections of the first and second source registers.

27. The apparatus of claim 22, wherein:
    source values stored in the first and second source registers comprise pixel values of video frames; and the first source register stores pixel values of a current block of a current frame and the second source register stores pixel values of two different blocks of a reference frame.

28. The apparatus of claim 22, wherein the processing unit is configured to perform the two independent SAD operations by:
  adding a result of another SAD operation stored in the first section of the destination register with the result of the first SAD operation and storing the sum in the first section of the destination register; and
  adding a result of another SAD operation stored in the second section of the destination register with the result of the second SAD operation and storing the sum in the second section of the destination register.

29. The non-transitory computer readable medium of claim 1, wherein the two independent SAD operations include a first SAD operation based on a first set of four pairs of corresponding values of the first source register and the second source register, and a second SAD operation based on a second set of four pairs of corresponding values of the first source register and the second source register.

30. The non-transitory computer readable medium of claim 1, wherein the first source register is 64 bits and the second source register is 64 bits.

31. The non-transitory computer readable medium of claim 30, wherein processing the sum-of-absolute-differences (SAD) instruction comprises using each bit of the first source register and each bit of the second source register in at least one independent SAD operation.

* * * * *